(Model.)

T. L. SMITH.
Cylinder Cock.

No. 231,110.  Patented Aug. 10, 1880.

WITNESSES:
Henry N. Miller
C. Sedgwick

INVENTOR:
T. L. Smith
BY Munn & Co
ATTORNEYS.

UNITED STATES PATENT OFFICE.

THOMAS L. SMITH, OF AMES, IOWA.

CYLINDER-COCK.

SPECIFICATION forming part of Letters Patent No. 231,110, dated August 10, 1880.

Application filed March 29, 1880. (Model.)

*To all whom it may concern:*

Be it known that I, THOMAS L. SMITH, of Ames, in the county of Story and State of Iowa, have invented a new and useful Improvement in Cylinder-Cocks, of which the following is a specification.

The object of my invention is to provide a safety cylinder-cock for steam-engines that will act automatically to discharge water that may be in the cylinder at any time, and thus avoid the danger arising from the presence of such water.

My invention consists in a cock having a plug fitted to turn on its seat for opening and closing the outlet, which plug is retained to its seat by a spring, so that it may be opened by endwise movement when the pressure is sufficient to overcome the spring, the cock thus constituting a combined cylinder-cock and safety-valve.

Figure 1:
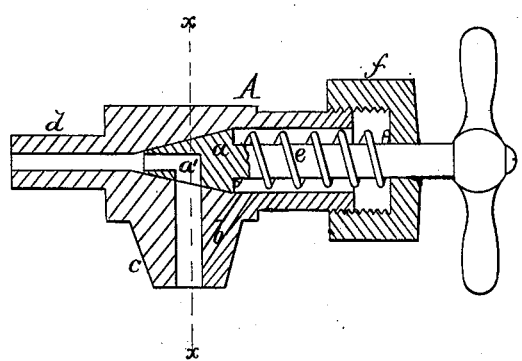
Figure 2:
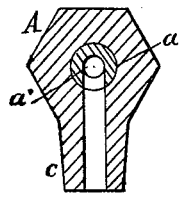

In the accompanying drawings, forming part of this specification, Figure 1 is a longitudinal section of my improved cock. Fig. 2 is a cross-section on line *x x*.

Similar letters of reference indicate corresponding parts.

A is the body of the cock, formed with the tubular end *d*, for screwing into the cylinder, and nozzle *c*, for discharge of steam and water. The nozzle *c* may be fitted with a pipe for conveying away the discharge steam or water.

*a* is the plug or valve, which is made of tapering or conical form, fitting to a seat of corresponding shape and provided with the aperture *a'*, for connecting the nozzle *c* with the tubular end *d*. The stem of the plug passes through a nut, *f*, on the end of the cock, and is fitted with a handle by which the plug may be turned to open and close the outlet. Around the stem of plug *a* is a spiral spring, *e*, which is compressed between the nut *f* and a shoulder of the plug, so that the spring tends to press the plug to its seat with more or less pressure, according to the adjustment of nut *f*, and at the same time an endwise movement of the plug is permitted by compression of the spring.

*b* is a small passage from above the plug *a* to the outlet *c*, for draining the space in which is the spring and keeping it free from water.

In operation, the cock is opened as usual when the engine is started by turning the plug *a*, which gives free escape from the cylinder. After the cock is closed, if there is any accumulation of water while the engine is running, either from overflow from the boiler, foaming, or other causes, the pressure of the piston-head upon such water will force the plug *a* endwise, thus opening communication around the tapered portion of the plug with the outlet *c*, and as soon as such pressure is removed the spring will return the plug to its seat.

By this construction the danger of bursting cylinder-heads or bending the piston-rod or crank is entirely avoided, the cock serving as a safety or relief valve.

The nut *f* may be prevented from turning by a set-screw or other device.

Having thus described my invention, I claim as new and desire to secure by Letters Patent—

In a cylinder-cock, the conical plug *a*, pressed by spring *e*, having angular passage *a'*, and provided with a handle for turning it, in combination with the body A, having nozzle *c*, tubular end *d*, and screw-cap *f*, all constructed and arranged to form a safety-cock, for operation as specified.

THOMAS L. SMITH.

Witnesses:
CHAS. F. MOUNT,
T. W. ADAMS.